United States Patent [19]

Hawkins

[11] Patent Number: 4,842,295
[45] Date of Patent: Jun. 27, 1989

[54] VEHICLE WHEEL SUSPENSION

[75] Inventor: Gene R. Hawkins, Warren, Mich.

[73] Assignee: General Motors Corporation, Detroit, Mich.

[21] Appl. No.: 173,895

[22] Filed: Mar. 28, 1988

[51] Int. Cl.[4] .................................. B62D 17/00
[52] U.S. Cl. ...................... 280/661; 280/690
[58] Field of Search ............ 280/96.1, 661, 673, 280/674, 690, 688

[56] References Cited

U.S. PATENT DOCUMENTS

| | | | |
|---|---|---|---|
| 3,422,918 | 1/1969 | Musser | 180/73.1 |
| 4,245,853 | 1/1981 | Inoue et al. | 280/701 |
| 4,462,241 | 7/1984 | Whisenant | 280/661 |
| 4,650,208 | 3/1987 | Mason | 280/661 |
| 4,693,487 | 9/1987 | Cooper | 280/661 |

FOREIGN PATENT DOCUMENTS 56-47008 11/1981 Japan .
61-48808 4/1986 Japan .

*Primary Examiner*—Richard A. Bertsch
*Attorney, Agent, or Firm*—Dean L. Ellis

[57] ABSTRACT

An "adaptive" wheel suspension linkage for automobiles and the like includes a pair of lateral extending arms or links spaced fore and aft of one another at pivots on the auto chassis and pivotally secured to the wheel knuckle, with one of such links having its inboard end automatically or adaptively adjusted to various positions vertically on the chassis, without any significant lateral displacement, in response to varying operating conditions, so as to suitably vary the roll steer property of the linkage.

3 Claims, 2 Drawing Sheets

VEHICLE WHEEL SUSPENSION

This invention relates to vehicle wheel suspensions and more particularly to automotive vehicle suspensions designed to impart desired caster, camber and toe orientation to the vehicle wheels during travel over the road.

One element in the design of such suspension systems is the so-called roll steer property, wherein it is usually desired that as the vehicle chassis sprung mass undergoes roll or rotation about its natural longitudinal roll axis during cornering maneuvers, the laterally opposite road wheels undergo a relative rise and fall but also assume some selected toe orientation relative the direction of vehicle travel imparting a sought under-, over-, or neutral-steer handling characteristic for the vehicle. The overall steer characteristic for the vehicle is, of course, influenced by factors beyond the pure geometric roll steer factor in the suspension linkage to which this invention is addressed, such factors including suspension system lateral compliance, tire slip angles, etc. As background to this invention, however, it is generally recognized that geometric roll steer response in suspension linkages can favorably affect vehicle handling for driver pleasure, and a variety of suspension structures exist in the art addressed to that purpose. In front steerable suspension arrangements, the presence of steering tie-rod connections to the wheel support members indeed necessitates attention to the influence of vehicle chassis roll on the steering parts. In rear suspensions similar attention is paid, even to the incorporation of auxiliary tie rods or similar laterally extending "toe links" as one purposeful expedient for providing prescribed toe-in/toe-out roll steer deflection of the rear wheels during rise and fall thereof in cornering maneuvers. Corvette and other vehicles produced by the assignee of this invention currently employ such arrangements, and Musser Jr. et al U.S. Pat. No. 3,422,918, issued Jan. 21, 1969 to such assignee, is an illustrative patent disclosure of such an auxiliary toe link arrangement for double wishbone or similar lateral control arm independent suspension systems.

Further as background, it is increasingly attractive as a general matter to complement the favorable handling properties of such prior art suspension geometry with "active" or "adaptive" augmentation systems which controlledly intervene and alter the basic handling properties of the suspension structures in accordance with varying road, vehicle cargo load, etc. conditions so as to maintain optimum response in the vehicle throughout such conditions. The present invention aims for adaptive roll steer response for vehicle suspension arrangements, particularly rear suspensions, and illustratively those which include lateral control links or similar members.

An example of the utility of the invention would be in the use, presently increasing, of auxiliary or accessory power levelling systems in connection with independent rear suspensions in which, responsive to varying occupant or cargo loads in the vehicle, the power system maintains the rear suspension system at a nominal design height desired for optimum appearance and road travel qualities. When such levelling systems are added to the vehicle, e.g., to a conventional lateral arm independent rear suspension arrangement, the basic suspension linkage layout desirably is retained for manufacturing efficiency. However, the levelling system will sometimes alter the natural roll steer properties of the basic suspension system. For example, in a typical basic such suspension, the designed-in roll steer of the vehicle when heavily loaded in the rear would be such as to counter the natural increase in slip angle experienced in the heavily loaded rear tires tending to create oversteer during cornering and, through the geometric change and spring deflection normally occasioned in the heavily loaded suspension linkage, impart an enhanced roll understeer response. With the addition of the levelling feature, however, the powered lift of the sprung chassis mass over the wheels back to nominal design height may lessen the enhancement of the geometric roll understeer ingredient.

The present invention provides a suspension arrangement which adapts itself to enable the desired roll steer characteristic for the vehicle in a variety of vehicle conditions, including varying load, speed, etc., and even in the presence of complexities such as levelling systems as above, or otherwise, by the provision of a lateral link means in such suspension through which such adaptive enablement or control can be exercised.

In its more specific aspects, the invention contemplates in an illustrative embodiment an independent rear suspension arrangement with at least one lateral suspension control arm member pivotally attached to the wheel support member or knuckle and mounted at its inboard end on the sprung chassis mass, and an adaptive link means or member for the wheel support member also laterally arranged between the support member and chassis mass and having its inboard end vertically adjustable relative to the latter without substantial lateral displacement, to vary the roll steer influence of these combined members on the wheel as the same rises and falls relative the chassis mass during cornering, adaptively or automatically in response to differing loading or other conditions of the vehicle.

These and other objects, features and advantages of the invention will be readily apparent from the following specification and from the drawings wherein.

Figure 1:
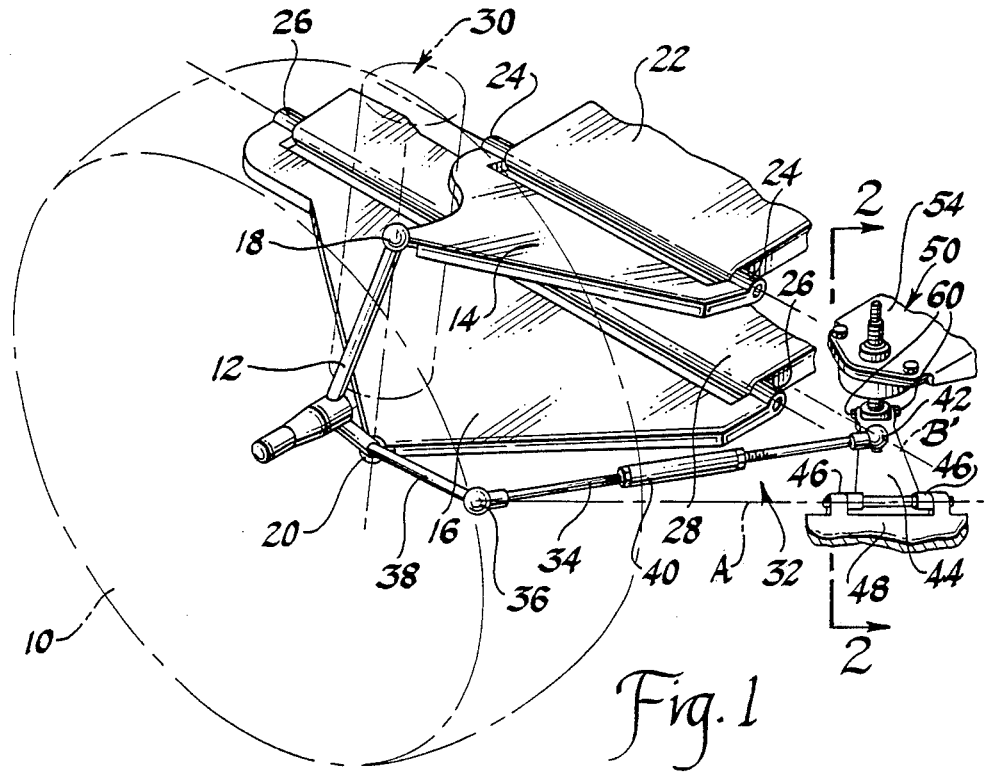
FIG. 1 is a fragmentary, perspective view of a rear suspension for automotive vehicles in accordance with the invention illustrated in a nominally loaded condition.

Referring now particularly to FIG. 1, the invention is illustratively embodied in the configuration of a double wishbone type independent type rear suspension for the road wheel, indicated in phantom at 10. Specifically, wheel 10 is adapted for mounting via bearings rotatably upon the spindle portion of a wheel support member or knuckle 12 of well known character and here only schematically illustrated. Wheel 10 and knuckle 12 are conventionally guided for rising and falling motion relative to the vehicle superstructure or chassis mass by the pair of laterally extending upper and lower wishbone or like control arms 14 and 16, respectively, the outboard ends or vertices of which are suitably pivotally attached to upper and lower regions of knuckle 12 such as by ball joint assemblies 18 and 20. The inboard end of upper control arm 14 is mounted upon the chassis mass of the vehicle, such as at a frame rail or rail extension thereof indicated at 22, by conventional rubber bushed or similar pin joints or pivots 24. Control arm 14 and upper ball joint 18 are thus constrained for swinging movement relative to the chassis mass about the longitudinal axis of the latter such as indicated. Similarly, lower control arm 16 extends laterally from a like inboard swingable mounting on the chassis mass such as by rubber-bushed pivots 26 affixed to another chassis rail or extension 28, likewise for relative swinging motion thereabout of such control arm and its ball joint connection 20 with knuckle 12 about the lower chassis mass longitudinal axis indicated at pivot 26.

Also conventionally included in such a suspension arrangement is a suitable elastic or spring medium, usually associated with a hydraulic or other damper, extending from a pivot connection at its bottom end on the lower control arm 16 upwardly to another pivot connection on an upper fixed portion of the chassis mass such as a strut tower member, not shown. This elastic and damper combination is schematically illustrated in phantom at 30 and may variously employ a coil steel spring, pneumatic bellows or other spring as the elastic medium, concentrically or otherwise related to coact with the hydraulic, pneumatic, or other damping component such as well known in the art. Further, such spring and damper assembly 30 may employ for vehicle levelling an expansible chamber or like device for maintaining the sprung chassis mass, including frame portions 22 and 28 thereof, at some nominal desired "design" height above the ground in relation to wheel 10.

The suspension apparatus of this invention is further provided with a tie rod, toe rod, or similarly appellated link means indicated generally at 32, including a toe link 34 comprised of a multi-part assembly including at its outboard end a ball joint 36 affixed to a steering arm 38 of knuckle 12. The steering arm extends rearward of the vehicle and the toe-link 34 is located rearwardly of the control arms, and it will be understood that the roll steer properties discussed hereinafter recognize that fact but also contemplate that like results of this invention will obtain with a toe link forwardly located relative the control arms. The portion of toe link 34 on which ball joint 36 is attached may be an adjustable rod threaded at its opposite end in a turnbuckle portion 40 which will serve, as is well known, to enable adjustment of the length of toe link 34 during manufacture or in service of the vehicle. The other end of the toe link includes a similar ball joint 42 provided at the end of another rod portion threaded into the turnbuckle.

Ball joint 42 is affixed intermediate the ends of an adaptive toe link adjustment arm 44 which is swingably mounted at a rearward outboard end thereof, via spaced pin connections 46, on another frame rail portion 48 of the sprung chassis mass. Thus, the arm 44 is swingable about an axis A of the vehicle sprung mass, which axis normally intersects the center of ball joint 36, i.e. with the vehicle at rest. At its other end, the arm 44 is connected with a toe link adjuster means, generally designated 50.

Figure 2:
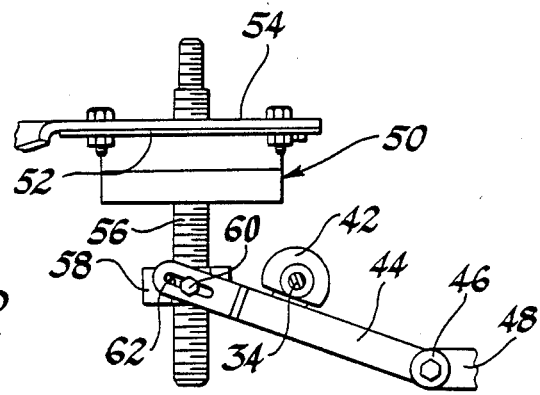
FIG. 2 is an enlarged elevational view taken generally along the plane indicated by lines 2—2 of FIG. 1.

Referring now to FIG. 2, adjuster means 50 incorporates a mounting body 52 secured to another frame portion 54 of the chassis mass and contains a suitable electric motor unit of the reversible type. The motor is arranged to drive or power-rotate in either direction a screw shaft 56 fixed suitably within body 52, such as by thrust bearings, against axial motion relative thereto. Meshed upon screw shaft 56 is a nut 58, and the bifurcated limbs of the distal end of arm 44 embrace such nut and are held thereto via pins 60 fixed in the nut and constrained within slots 62 in the links of the arm. Thus, upon powered rotation of screw shaft 56 in either direction, arm 44 may be raised or lowered at its distal end relative the sprung chassis mass along with the inboard end of toe link 34 at ball joint 42, such adjustment occurring about axis A. As a consequence of such adjustment, the inboard end of toe link 34 is relocated relative the chassis mass for rotation, as wheel 10 rises and falls, about any one of a vertical range of longitudinal axes of the vehicle, one such axis being indicated at B' in FIGS. 1 and 4 and another at B" in FIG. 5. Arm 44 on axis A, serving for this vertical adjustment of the position of ball joint 42, is readily seen as just one expedient suitable therefor. For example, the elements of means 50 might be made strong enough to directly mount ball joint 42, eliminate arm 44, and carry alone the loads sustained in the ball joint during use. With expedients like arm 44, any slight lateral displacement arising during vertical adjustment would be merely coincident to whatever inclination of axis A required to clear toe link 34 from whatever particular adjacent structure with which this invention is used.

Figure 3:
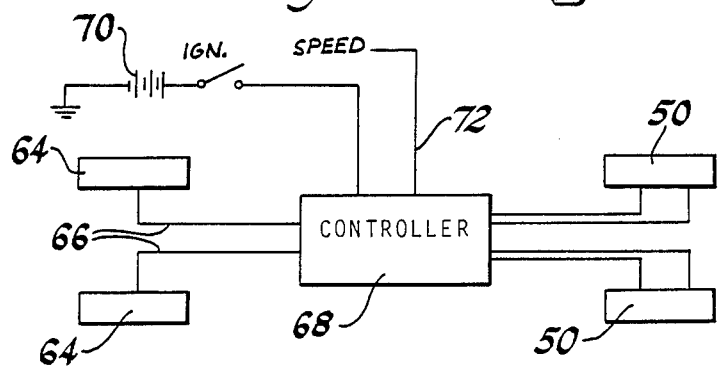
FIG. 3 is a schematic of an adaptive control scheme for the suspension.

Referring to FIG. 3, a control system for adaptively locating such toe link position to various vehicle conditions illustratively includes elements responsive to the presence of a power levelling system in the suspension. For example, both the left and right rear independent suspension structures may include an air levelling expansible chamber device, not shown but well known, controllable in conventional manner to maintain the nominal design height of the vehicle. The pneumatic pressure applied in such chambered devices to accomplish such levelling may be sensed by air pressure sensors 64 capable of a converted electrical signal applied via leads 66 to a suitable microcomputer or controller unit 68 connected with the vehicle electrical power source or battery 70. The controller is illustratively responsive to closure of the vehicle ignition switch and further responsive to a suitable vehicle speed sensing unit such as an electronic speedometer connected by a lead 72. The controller will, depending upon vehicle conditions encountered including the load over the rear wheels sensed by air pressure sensors 64, or the speed signaled via lead 72, etc., apply appropriate energization of the electric motors of each of adjuster means or actuators 50, thereby to impart appropriate relocation of the arms 44 and ball joints 42.

Figure 4:
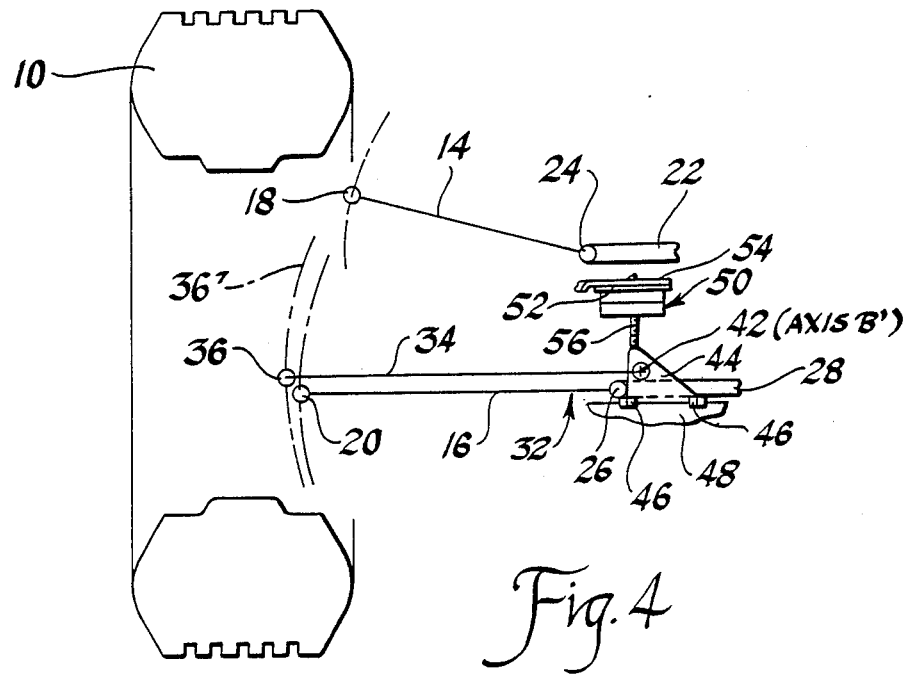
FIGS. 4 and 5 are generally schematic rear elevational views of the suspension arrangement when experiencing the nominally loaded condition of FIG. 1 and another highly loaded condition, respectively.
Figure 5:
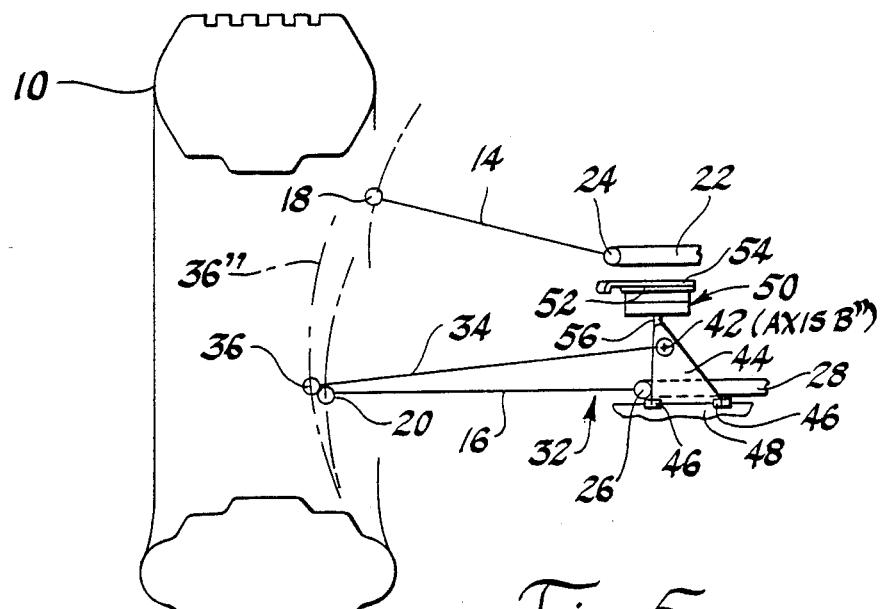

Referring to FIGS. 4 and 5, the utility of this invention will be specifically discussed with reference to just the one example, as hereinabove, of a suspension having the auxiliary or accessory levelling system. In such case, expansible chamber devices powered by hydraulic or air pressure, and controlled by suitable height sensing devices in or around control arm 14 and 16, will operate to maintain the sprung chassis mass (items 22, 28, 48 and 54) at substantially the nominal or design height above the ground, and the elastic member of unit 30 at substantially the same deflection, over the expected range of vehicle rear loadings. FIG. 4 shows a lightly or nominally loaded condition for the rear suspension, while FIG. 5 shows a heavy load as indicated by the tire profile at the ground, yet it is seen that the chassis sprung mass is at the same design height and the control arms 14 and 16 at similar angles thereto in rear elevation, all as typically accomplished by a levelling system. In the operation of the system of this invention as between such circumstances, air pressure sensors 64 of the air-powered levelling system (for example) would provide electrical signals to controller 68 by which the controller would impart power to actuators or adjuster means 50 causing the screw shafts 56 to rotate and nuts 58 to assume different positions for the two different conditions illustrated. Thus, in FIG. 4, it is seen that the nuts 58 are moved so as to locate arm 44 and ball joint 42 to a low position at axis B' relative the sprung chassis mass above the ground, whereby a moderated roll-understeer arc 36' for ball joint 36 will be described in rear elevation during rise of wheel 10 or centrifugally forced depression of the chassis mass at that side caused by its roll while cornering. More specifically, such arc taken with the axes of ball joints 18 and 20 as viewed in plan will provide a moderated toe-in of rising wheel 10 for an understeer effect, (and conversely a moderated toe-out understeer for the opposite ball joint counterpart during a relative fall of the opposite wheel caused by such roll). In this way, even in the presence of a levelling system, the roll steer property is maintained at a moderated understeer value which could be desired for this nominal rear loading condition. It ought also to be appreciated that as to "bump steer" performance, i.e. large like displacements of opposite wheels 10 up and over, e.g., a large tarstrip, only a like moderated toe-in deflection occurs during such jounce or ride deflection of both of the rear wheels, and is a ride comfort benefit in this situation of FIG. 4. In FIG. 5, it is seen that the heavily loaded rear wheel 10 can have imparted thereto an increased toe-in or roll-understeer response by raising of ball joint 42 to axis B'', thereby to describe for ball joint 36 an exaggerated toe-in arc 36'' during relative rise of wheel 10 (and toe-out arc during relative fall of the opposite wheel). This is accomplished via controller 68 operating on the heavy-load signals from sensors 64 to cause adjuster nuts 58 such as that shown to assume a position for arm 44 as shown. Thus, the increased slip angles tending toward over-steer in each heavily loaded rear tire is closely balanced by the changed roll steer geometry in the rear suspension linkage, even in the presence of a levelling system which maintains the sprung chassis mass and the major elements of such linkage at "design" conditions. Of course, some bump steer effect is realized in the condition shown in FIG. 5.

It is contemplated that in the instant adaptive system should an electronic failure occur, involving controller 68 for example, the roll steer properties are acceptable regardless of which of conditions, FIGS. 4 or 5, may exist at the time of failure. If it occurs in the condition of FIG. 4, the electrical system including controller 68 could easily be augmented for overrides, or driver notices to encourage him or her to service the system prior to any attempt to place extraordinary loads at the rear of the vehicle.

The above explanations, relating to load variation and the signals of sensors 64, apply equally well but separately to considerations of vehicle speed when employing this system. Rather than load signals, it may be desired that speedometer signals become effective to vary the positions of ball joints 42 for desired variable toe-in or toe-out attitudes of toe link 34 for desired understeer, neutral steer, or oversteer characteristic in the various speed ranges the vehicle might experience. And, of course, a combination of load and speed signals might be preferred in carrying out the invention. Similarly, it will be understood that the invention is not limited to the specific suspension linkage arrangement shown. Numerous known combinations of lateral links are possible candidates for the principles of the invention set forth above, as are also their related counterpart longitudinal link suspensions.

The embodiments of the invention in which an exclusive property or privilege is claimed are defined as follows:

1. In a vehicle road wheel suspension connecting such wheel with the chassis mass of the vehicle for guided motion relative thereto, the combination comprising, a wheel support member, support member guidance means including at least one laterally extending control arm pivotally attached to the support member and swingably mounted at its inboard end to the chassis mass, laterally extending toe-controlling link means in spaced relation with the control arm, pivotally attached to the support member, and adapted for swingable movement about an axis inboard of the chassis mass, and power-operated means for locating said axis selectively adjustably to various positions vertically with respect to said chassis mass without substantial lateral displacement, whereby to vary the toe-in/toe-out displacement of said wheel support member during motion of the latter relative to the chassis mass.

2. In a vehicle road wheel suspension connecting such wheel with the chassis mass of the vehicle for guided motion relative thereto, the combination comprising, a wheel support member, support member guidance means including at least one laterally extending control arm pivotally attached to the support member, means swingably mounting an inboard end of said control arm to the chassis mass for motion about a fixed axis thereof, a laterally extending toe-controlling link in spaced relation with the control arm, pivotally attached to the support member, and adapted to be swingably mounted at an inboard end thereof to said chassis mass, and selectively adjustable means mounting said inboard end of said means to said chassis mass so that under such selective adjustment said inboard end is movable without substantial lateral displacement to various positions vertically with respect to said fixed axis of the control arm, whereby to vary the toe-in/toe-out displacement of said wheel support member during motion of the latter relative to the chassis mass.

3. In a vehicle road wheel suspension connecting such wheel with the chassis mass of the vehicle for guided motion relative thereto, the combination comprising, a wheel support member, support member guidance means including at least one laterally extending control arm pivotally attached to the support member and swingably mounted at its inboard end to the chassis mass, laterally extending toe-controlling link means in spaced relation with the control arm, pivotally attached to the support member, and adapted to be swingably mounted at an inboard end thereof to said chassis mass, means mounting said inboard end of said link to said chassis mass for movement generally vertically to various positions with respect thereto without substantial lateral displacement, power operated means for so moving said inboard end of said link, and means for controlling said power-operated means selectively in response to load and/or speed conditions of the vehicle whereby to vary the toe-in/toe-out displacement of said wheel support member during motion of the latter relative to the chassis mass.

* * * * *